United States Patent
Kinouchi

(10) Patent No.: US 9,513,690 B2
(45) Date of Patent: Dec. 6, 2016

(54) APPARATUS AND METHOD FOR ADJUSTING OPERATING FREQUENCIES OF PROCESSORS BASED ON RESULT OF COMPARISON OF POWER LEVEL WITH A FIRST THRESHOLD AND A SECOND THRESHOLD

(71) Applicant: FUJITSU LIMITED, Kawasaki-shi, Kanagawa (JP)

(72) Inventor: Ikkei Kinouchi, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 121 days.

(21) Appl. No.: 14/495,510

(22) Filed: Sep. 24, 2014

(65) Prior Publication Data
US 2015/0121104 A1 Apr. 30, 2015

(30) Foreign Application Priority Data

Oct. 24, 2013 (JP) ................. 2013-220867

(51) Int. Cl.
G06F 1/00 (2006.01)
G06F 1/32 (2006.01)
G06F 1/30 (2006.01)
G06F 1/28 (2006.01)

(52) U.S. Cl.
CPC ............. *G06F 1/324* (2013.01); *G06F 1/3206* (2013.01); *G06F 1/3287* (2013.01); *G06F 1/28* (2013.01); *G06F 1/30* (2013.01); *G06F 1/3234* (2013.01); *G06F 1/3293* (2013.01); *G06F 1/3296* (2013.01); *Y02B 60/1217* (2013.01); *Y02B 60/1282* (2013.01)

(58) Field of Classification Search
CPC ............ G06F 1/30; G06F 1/3234; G06F 1/28; G06F 1/324; G06F 1/3293; G06F 1/3296
See application file for complete search history.

(56) References Cited

U.S. PATENT DOCUMENTS

| | | | |
|---|---|---|---|
| 2002/0132653 A1* | 9/2002 | Okamoto | G06F 1/3203 455/574 |
| 2011/0264952 A1 | 10/2011 | Heinrichs et al. | |
| 2012/0060041 A1 | 3/2012 | Hashimoto | |
| 2013/0080817 A1* | 3/2013 | Mihelic | H04J 3/0667 713/401 |
| 2013/0318389 A1* | 11/2013 | Cong | G06F 1/28 713/340 |

FOREIGN PATENT DOCUMENTS

| | | |
|---|---|---|
| JP | 2007-143236 | 6/2007 |
| JP | 2012-51300 | 3/2012 |
| JP | 2012-511199 | 5/2012 |
| JP | 2012-151944 | 8/2012 |

\* cited by examiner

*Primary Examiner* — Xuxing Chen
(74) *Attorney, Agent, or Firm* — Staas & Halsey LLP

(57) ABSTRACT

An information processing method using a first information processing apparatus, the first information processing apparatus including a power supply circuit, a first processor configured to receive power supply from the power supply circuit, and a second processor configured to receive power supply from the power supply circuit, the information processing method includes decreasing an operating frequency of the first processor, based on a decrease in an amount of power supply from the power supply circuit; and stopping data processing of the first processor in a state in which the second processor is being operated, after decreasing the operating frequency of the first processor.

14 Claims, 16 Drawing Sheets

FIG. 4

|  | PROCESS DESCRIPTIONS |
|---|---|
| FIRST ARITHMETIC PROCESSING UNIT | SHUTDOWN |
| SECOND ARITHMETIC PROCESSING UNIT | MAINTAIN THROTTLING CONTROL |

FIG. 15

|  | PROCESS DESCRIPTIONS | |
| --- | --- | --- |
|  | FIRST POLICY | SECOND POLICY |
| FIRST ARITHMETIC PROCESSING UNIT | SHUTDOWN | MAINTAIN THROTTLING CONTROL |
| SECOND ARITHMETIC PROCESSING UNIT | MAINTAIN THROTTLING CONTROL | MAINTAIN THROTTLING CONTROL |

APPARATUS AND METHOD FOR ADJUSTING OPERATING FREQUENCIES OF PROCESSORS BASED ON RESULT OF COMPARISON OF POWER LEVEL WITH A FIRST THRESHOLD AND A SECOND THRESHOLD

CROSS-REFERENCE TO RELATED APPLICATION

This application is based upon and claims the benefit of priority of the prior Japanese Patent Application No. 2013-220867, filed on Oct. 24, 2013, the entire contents of which are incorporated herein by reference.

FIELD

The embodiments discussed herein are related to an information processing method, an information processing apparatus, and a non-transitory computer-readable storage medium.

BACKGROUND

A technique has been put to practical use in which, in an information processing apparatus such as a server that performs various information processing, multiple power supply circuits such as AC-DC conversion circuits are disposed as power supply units, and information processing is performed by using electric power supplied from the multiple power supply circuits. By using multiple power supply circuits, even when a failure or performance degradation occurs in one power supply circuit and the amount of power supply decreases, the information processing apparatus is able to continue processing with power supplied from another or other power supply circuits.

However, in a case where a decrease in the amount of power supply occurs in one or some of the multiple power supply circuits, the load on another or other power supply circuits increases, which may cause a failure or the like to occur also in another or other power supply circuits. Throttling exits as a technique for addressing this problem. According to the throttling technique, in a case where the amount of power supply from one or some power supply circuits decreases in an information processing apparatus having multiple power supply circuits, the operating frequency of the processor of the information processing apparatus is decreased. By decreasing the operating frequency of the processor, power consumed by the processor is minimized to thereby reduce the load on another or other power supply circuits.

Like multi-node servers, information processing apparatuses having multiple arithmetic processing units have been put to practical use. Multi-node servers have the following advantage. That is, in a case where maintenance such as inspection or replacement is to be performed for one of the multiple arithmetic processing units, maintenance may be performed individually only on that specific arithmetic processing unit. It is possible for the multiple arithmetic processing units included in multi-node servers to both perform information processing individually and perform predetermined information processing in corporation with each other. Further, there are also cases where an information processing apparatus having multiple arithmetic processing units and another information processing apparatus are coupled via a network to thereby configure a single computer system, for example, a high performance computer (HPC) as a whole. In such cases, the multiple information processing apparatuses perform information processing in corporation with each other.

As related art, Japanese Laid-open Patent Publication No. 2012-051300 exists.

SUMMARY

According to an aspect of the invention, an information processing method using a first information processing apparatus, the first information processing apparatus including a power supply circuit, a first processor configured to receive power supply from the power supply circuit, and a second processor configured to receive power supply from the power supply circuit, the information processing method includes decreasing an operating frequency of the first processor, based on a decrease in an amount of power supply from the power supply circuit; and stopping data processing of the first processor in a state in which the second processor is being operated, after decreasing the operating frequency of the first processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a shutdown list according to the first embodiment;

FIG. 15 illustrates an example of a shutdown list according to a third embodiment.

DESCRIPTION OF EMBODIMENTS

With regard to a computer system including an information processing apparatus having multiple arithmetic processing units like a multi-node server, and another information processing apparatus, no study has been undertaken to date for a technique to minimize a decrease in the information processing speed of the computer system while controlling the operating frequency to protect the power supply unit.

The embodiments provide an information processing method and an information processing apparatus which minimize degradation of the information processing speed of a computer system while protecting its power supply unit.

According to the disclosed technique, in a case where the amount of power supply from the power supply unit decreases, the power load on the power supply unit may be reduced, and also a decrease in the throughput of the computer system may be minimized.

First Embodiment

Figure 1:
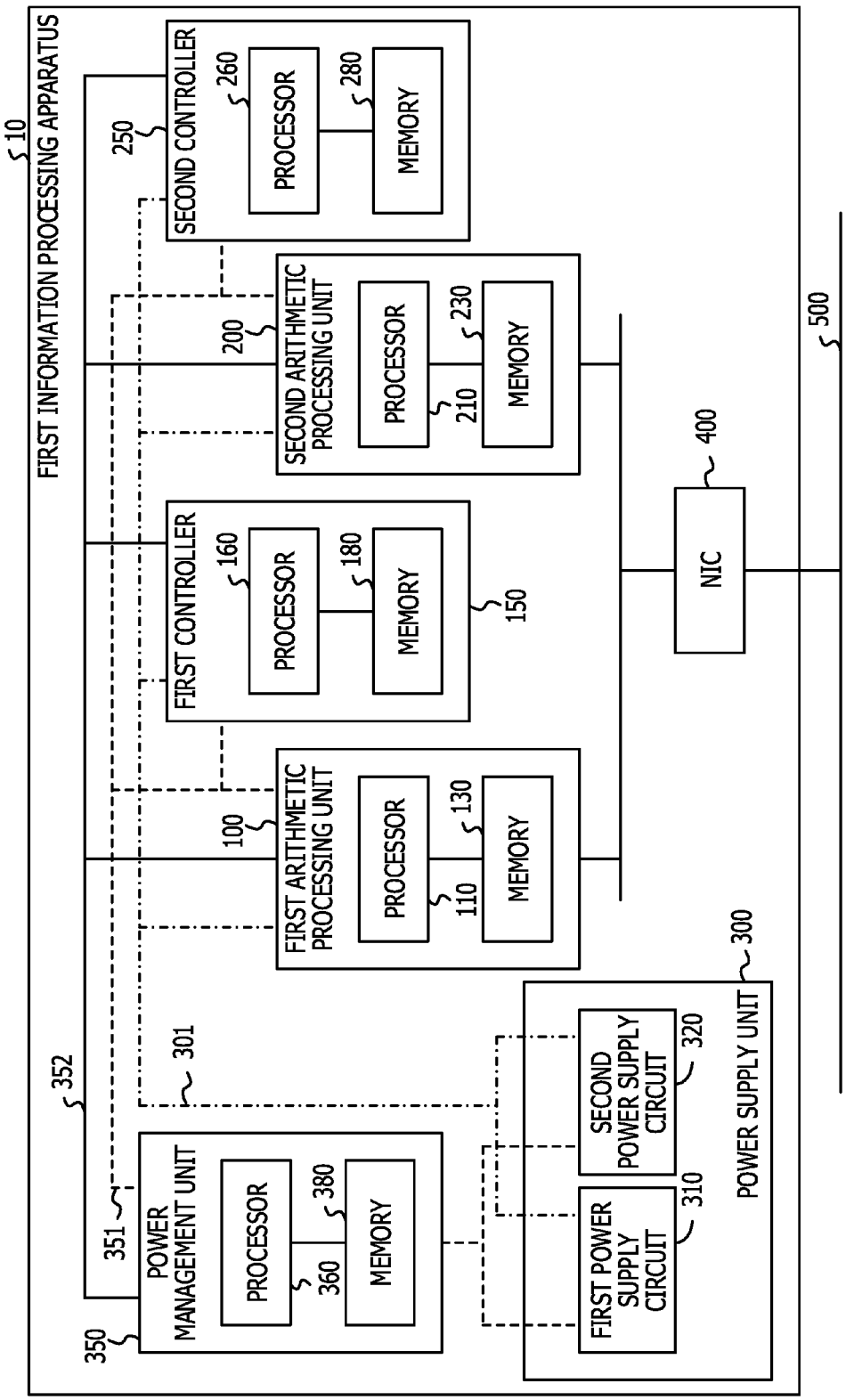
FIG. 1 is a hardware configuration diagram of an information processing apparatus according to a first embodiment.

FIG. 1 is a hardware configuration diagram of an information processing apparatus according to a first embodiment. A first information processing apparatus 10 has a first arithmetic processing unit 100, a second arithmetic processing unit 200, a first controller 150, a second controller 250, a power supply unit 300, a power management unit 350, and a network interface card (NIC) 400. The first arithmetic processing unit 100 has a processor 110, and a memory 130 coupled to the processor 110. Likewise, the second arithmetic processing unit 200 has a processor 210, and a memory 230 coupled to the processor 210. The first arithmetic processing unit 100 and the second arithmetic processing unit 200 execute arithmetic processing by receiving supply of electric power from the power supply unit 300 via a power supply line 301. The first controller 150 has a processor 160, and a memory 180 coupled to the processor 160. Likewise, the second controller 250 has a processor 260, and a memory 280 coupled to the processor 260. The first controller 150 and the second controller 250 control the first arithmetic processing unit 100 and the second arithmetic processing unit 200, respectively, by receiving supply of electric power from the power supply unit 300 via the power supply line 301.

The power supply unit 300 has a first power supply circuit 310 and a second power supply circuit 320. In a case where the first power supply circuit 310 and the second power supply circuit 320 each have a power supply capacity of, for example, 700 W, the power supply unit 300 has a power supply capacity of 1400 W as a whole. The power management unit 350 has a processor 360, and a memory 380 coupled to the processor 360. The power management unit 350 is coupled to the first arithmetic processing unit 100, the second arithmetic processing unit 200, the first controller 150, the second controller 250, and the power supply unit 300 by a power supply management bus 351. The power management unit 350 detects a decrease in the amount of power supply from the power supply unit 300, and issues a throttling-control instruction, via the power supply management bus 351. A decrease in the amount of power supply from the power supply unit 300 is detected by, for example, monitoring the output voltages of the first power supply circuit 310 and second power supply circuit 320, and detecting that either one of the output voltages has dropped below a predetermined threshold. Further, the power management unit 350 is coupled to the first arithmetic processing unit 100, the second arithmetic processing unit 200, the first controller 150, and the second controller 250 by an internal bus 352. The power management unit 350 issues an instruction for releasing throttling control, and executes various communications related to a shutdown described later. The first information processing apparatus 10 is coupled to another information processing apparatus via the NIC 400 and a network 500.

The first information processing apparatus 10 is, for example, a multi-node server having multiple arithmetic processing units. Each of the processors 110, 160, 210, 260, and 360 is an electronic circuit component such as a central processing unit (CPU), a micro-processing unit (MPU), a digital signal processor (DSP), or a field-programmable gate array (FPGA). Each of the memories 130, 180, 230, 280, and 380 is an electronic circuit component such as a dynamic random access memory (DRAM), a static random access memory (SRAM), or a flash memory. Each of the first power supply circuit 310 and the second power supply circuit 320 is, for example, an AC-DC conversion circuit. Each of the first controller 150 and the second controller 250 is, for example, a management controller such as a baseboard management controller (BMC). The power supply management bus 351 is, for example, a PMBus (registered trademark). The internal bus 352 is, for example, an intelligent platform management bus (IPMB).

Figure 2:
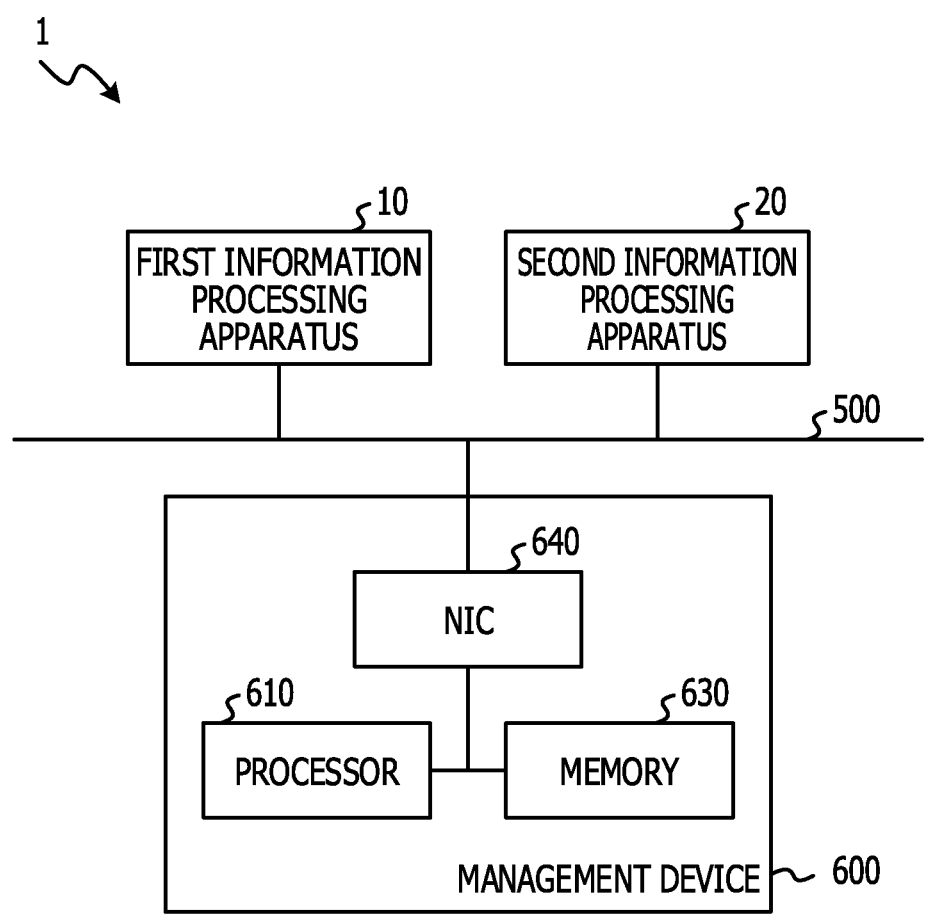
FIG. 2 is a hardware configuration diagram of a computer system according to the first embodiment.

FIG. 2 is a hardware configuration diagram of a computer system including the first information processing apparatus 10 described above with reference to FIG. 1. A computer system 1 has the first information processing apparatus 10, a second information processing apparatus 20, a management device 600, and the network 500. The first information processing apparatus 10 and the second information processing apparatus 20 are coupled to each other via the network 500. The second information processing apparatus 20 has the same hardware configuration as the first information processing apparatus 10. The management device 600 has a processor 610, a memory 630 coupled to the processor 610, and a NIC 640 coupled to the network 500. The management device 600 is coupled to the first information processing apparatus 10 and the second information processing apparatus 20 via the NIC 640 and the network 500, and controls the first information processing apparatus 10 and the second information processing apparatus 20 as to as perform information processing in synchronism with each other.

Now, a problem that arises in a case where the throttling technique is applied to the first information processing apparatus 10 of the computer system 1 illustrated as FIG. 2 will be described. This problem is discovered for the first time by the inventor in the course of arriving at the embodiments disclosed. For example, suppose that in the first information processing apparatus 10, power is supplied to the first arithmetic processing unit 100 and the second arithmetic processing unit 200 from both of the first power supply circuit 310 and the second power supply circuit 320. Suppose that, at this time, the power supply capacity of the first power supply circuit 310 decreases, causing the power supply load on the second power supply circuit 320 to increase.

In order to reduce the load on the second power supply circuit 320, throttling is performed for the first arithmetic processing unit 100 and the second arithmetic processing unit 200. That is, by decreasing the operating frequency of each of the processor 110 of the first arithmetic processing unit 100 and the processor 210 of the second arithmetic processing unit 200, power consumption in each of the first arithmetic processing unit 100 and the second arithmetic processing unit 200 is minimized.

However, decreasing the operating frequency of each of the first arithmetic processing unit 100 and the second arithmetic processing unit 200 practically leads to a decrease in the information processing capacity of the second information processing apparatus 20 that constitutes the computer system 1 together with the first information processing apparatus 10. This is because the first information processing apparatus 10 and the second information processing apparatus 20 perform information processing in synchronism with each other while communicating information such as the results of arithmetic processing with each other. Consequently, when the operating frequency of the arithmetic processing unit in the second information processing apparatus 20 becomes lower than the operating frequency of the arithmetic processing unit in the first information processing apparatus 10, the second information processing apparatus 20 is unable to make full use of its throughput capacity. As a result, the overall throughput of the computer system 1 decreases.

As described above, in the case of applying the throttling technique to the computer system 1 illustrated as FIG. 2, the control method employed has to take not only protection of the power supply unit 300 but also the overall throughput of the computer system 1 into consideration.

Hereinafter, a description will be made of a control method executed based on both the perspectives of protection of the power supply unit 300 and the throughput of the computer system 1. In the first embodiment, when the power management unit 350 detects a decrease in the amount of power supply from the power supply unit 300, throttling control is performed for the first arithmetic processing unit 100 and the second arithmetic processing unit 200 first. By decreasing the operating frequency of each of the first arithmetic processing unit 100 and the second arithmetic processing unit 200, the load on the power supply unit 300 is reduced. Next, one or some of the multiple arithmetic processing units, for example, the first arithmetic processing unit 100 is shut down, and thereafter the operating frequency of another or other arithmetic processing units, for example, the second arithmetic processing unit 200 is increased. By increasing the operating frequency of the second arithmetic processing unit 200, a situation is avoided in which the throughput capacity of the second information processing apparatus 20 that performs information processing in synchronism with the first information processing apparatus 10 is not fully exploited. Further, because power consumption is reduced by shutting down the first arithmetic processing unit 100, even when the operating frequency of the second arithmetic processing unit 200 is increased, the power load on the power supply unit 300 may be minimized. It is to be understood that the term "shutdown" as used in this specification means a state in which the processor of an arithmetic processing unit is not executing arithmetic processing, and usage of the term is not limited to a state in which power is not being supplied to an arithmetic processing unit at all. In this specification, the term "shutdown" also includes entering a so-called standby state, for example, a state in which supply of a clock to a processor is stopped while maintaining supply of power to a memory included in an arithmetic processing unit, and arithmetic processing is not being executed by the processor.

Now, the reason for decreasing the operating frequency of each of the first arithmetic processing unit 100 and the second arithmetic processing unit 200 once by throttling control prior to executing a shutdown of the first arithmetic processing unit 100 will be described. Throttling control, and a shutdown of one or some arithmetic processing units are the same in the sense that both reduce the load on the power supply unit 300 by decreasing power consumption of the first information processing apparatus 10. However, it takes a certain amount of time to shut down an arithmetic processing unit that is executing arithmetic processing. It takes several minutes to several tens of minutes to shut down each of nodes in a multi-node server. Consequently, even if a shutdown of the first arithmetic processing unit 100 is started when a decrease in the amount of power supply capacity occurs in the power supply unit 300 due to some reason, the load on the power supply unit 300 continues to act until the shutdown is completed. As opposed to this, a transition to throttling control is made by decreasing the frequency of a clock supplied to a processor, and hence may be completed in a short time in comparison to a shutdown.

Accordingly, in the first embodiment, in a case where the amount of power supply from the power supply unit 300 decreases, throttling is executed first to reduce the load on the power supply unit 300. This makes it possible to shorten the time for which an excessive load acts on the power supply unit 300 in comparison to the case of executing a shutdown. Then, after a transition is made to throttling control, the first arithmetic processing unit 100 is shut down, and then the throttling for the second arithmetic processing unit 200 is released. This minimizes a practical decrease in the throughput of the second information processing apparatus 20 that performs information processing in cooperation with the first information processing apparatus 10. Hereinafter, the first embodiment will be described in detail.

Figure 3:
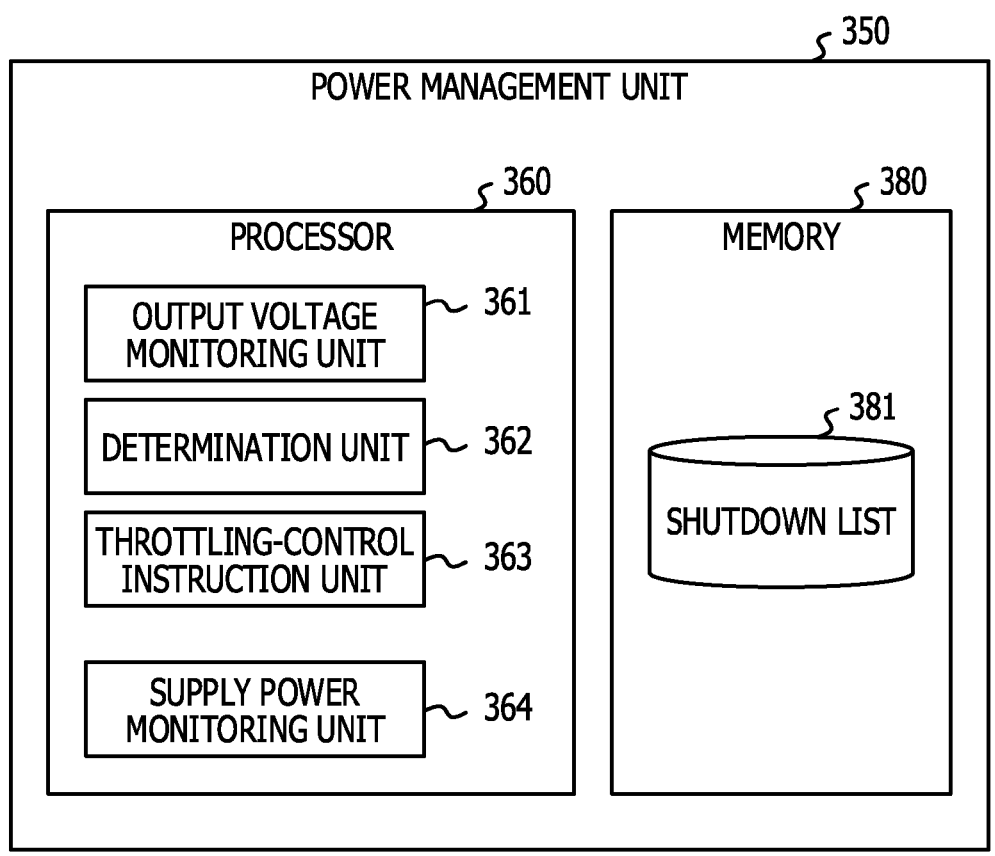
FIG. 3 is a functional block diagram of a power management unit according to the first embodiment.

FIG. 3 illustrates functional blocks of the processor 360 of the power management unit 350, and information stored in the memory 380. The processor 360 implements the function of each block illustrated as FIG. 3 by executing a predetermined program that is stored in either the memory 380 or one of the memories included in the first information processing apparatus 10, or another memory that may be accessed via the network 500. The processor 360 functions as an output voltage monitoring unit 361, a determination unit 362, a throttling-control instruction unit 363, and a supply power monitoring unit 364.

The output voltage monitoring unit 361 monitors the respective output voltages of the first power supply circuit 310 and second power supply circuit 320. The determination unit 362 determines whether or not at least one of the output voltages of the first power supply circuit 310 and second power supply circuit 320 has fallen below a predetermined threshold, based on the results of monitoring by the output voltage monitoring unit 361. Based on the determination result of the determination unit 362, the throttling-control instruction unit 363 instructs the first arithmetic processing unit 100 and the second arithmetic processing unit 200 to transition to throttling control via the power supply management bus 351. This instruction is performed by storing a throttling flag into a throttling flag storing unit described later. The supply power monitoring unit 364 monitors the power supplied to the first arithmetic processing unit 100 and the second arithmetic processing unit 200 from the power supply unit 300. The supply power monitoring unit 364 recognizes the completion of a shutdown of an arithmetic processing unit from fluctuations in supplied power, and notifies a shutdown completion checking unit described later to that effect. Not all of these functions have to be implemented in the processor 360. For example, the output voltage monitoring unit 361 may be implemented in a dedicated voltage sensor.

The memory 380 stores a shutdown list 381. FIG. 4 illustrates an example of the shutdown list 381. The shutdown list 381 is a table that specifies which one of the multiple arithmetic processing units is to be shut down in a case where the power supply capacity of the power supply unit 300 decreases. The shutdown list 381 illustrated as FIG. 4 specifies that the first arithmetic processing unit 100 is subject to shutdown, and that the second arithmetic processing unit 200 is not subject to shutdown. The arithmetic processing unit that is specified in the shutdown list 381 as being subject to shutdown is shut down after a transition is made to throttling control. As for the arithmetic processing unit that is specified in the shutdown list 381 as not being subject to shutdown, after the arithmetic processing unit makes a transition to throttling control, the throttling control is released after a shutdown of a predetermined arithmetic processing unit is completed. Unless particularly specified otherwise, the following description of this specification assumes that, in accordance with the contents of the shutdown list 381 illustrated as FIG. 4, the first arithmetic processing unit 100 is subject to shutdown, and the second arithmetic processing unit 200 is not subject to shutdown.

Figure 5:
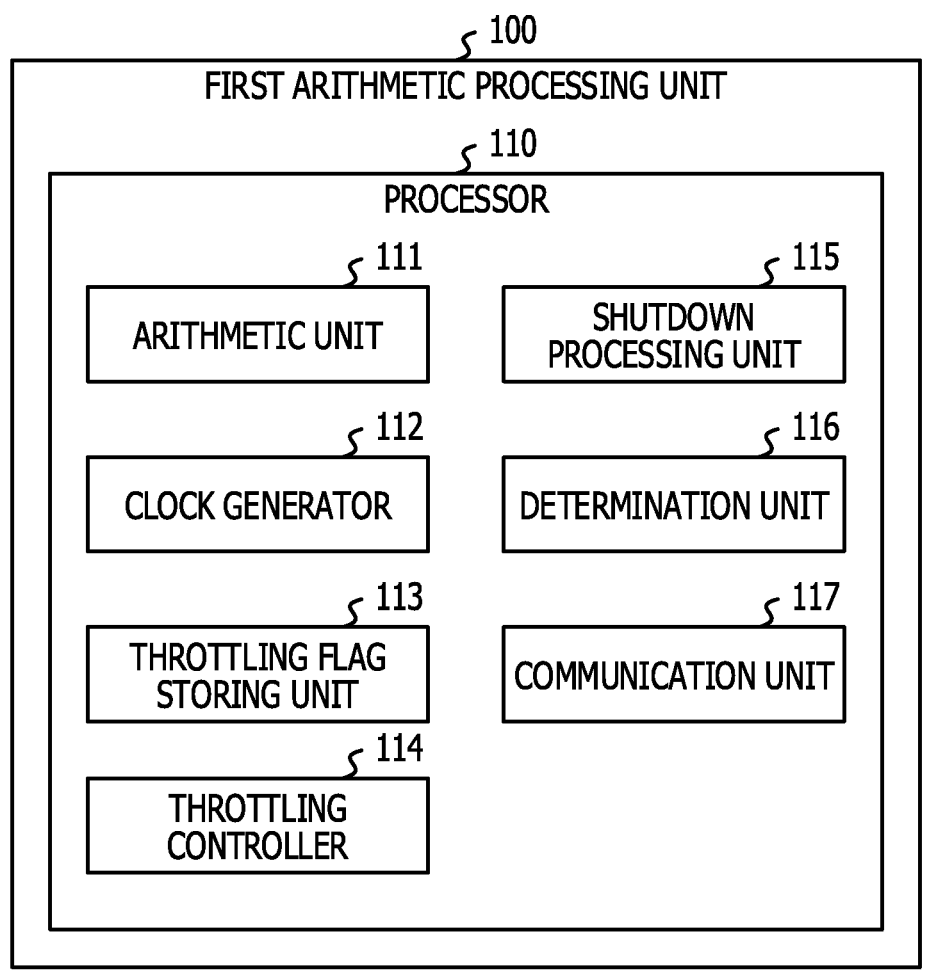
FIG. 5 is a functional block diagram of an arithmetic processing unit according to the first embodiment.

FIG. 5 is a functional block diagram of the processor 110 of the first arithmetic processing unit 100. The processor 110 implements the function of each block illustrated as FIG. 5 by executing a predetermined program stored in either the memory 130 or one of the memories included in the first information processing apparatus 10, or another memory that may be accessed via the network 500. The processor 210 of the second arithmetic processing unit 200 also implements the same functions as those of the processor 110 of the first arithmetic processing unit 100 by executing a predetermined program. In the following, the description will be directed to the processor 110 of the first arithmetic processing unit 100, and a description of the processor 210 of the second arithmetic processing unit 200 will be omitted.

The processor 110 functions as an arithmetic unit 111, a clock generator 112, a throttling flag storing unit 113, a throttling controller 114, a shutdown processing unit 115, a determination unit 116, and a communication unit 117. The arithmetic unit 111 executes arithmetic processing based on a clock supplied from the clock generator 112. The clock generator 112 generates a clock having a predetermined frequency, and supplies the clock to the arithmetic unit 111. Power consumption of the arithmetic unit 111 increases or decreases depending on the frequency of the clock generated by the clock generator 112. The throttling flag storing unit 113 stores a throttling flag in response to an instruction for transition to throttling control which is transmitted from the power management unit 350. The throttling controller 114 references information of a flag in the throttling flag storing unit 113, and in a case where a throttling flag is stored in the throttling flag storing unit 113, the throttling controller 114 executes throttling control. Specifically, the throttling controller 114 instructs the clock generator 112 to decrease the frequency of the clock generated by the clock generator 112. The shutdown processing unit 115 executes a shutdown of the first arithmetic processing unit 100. The determination unit 116 performs various determinations that have to be performed in executing a shutdown and throttling control. The communication unit 117 performs various communications that have to be performed in executing a shutdown or throttling control, with the first controller 150, the second controller 250, or the power management unit 350. Not all of these functions have to be implemented in the processor 110. One or some of these functions, for example, the clock generator 112 may be implemented in a phase locked loop (PLL) circuit or the like. Alternatively, the throttling flag storing unit 113 may be implemented by using a dedicated register included in the first arithmetic processing unit 100.

Figure 6:
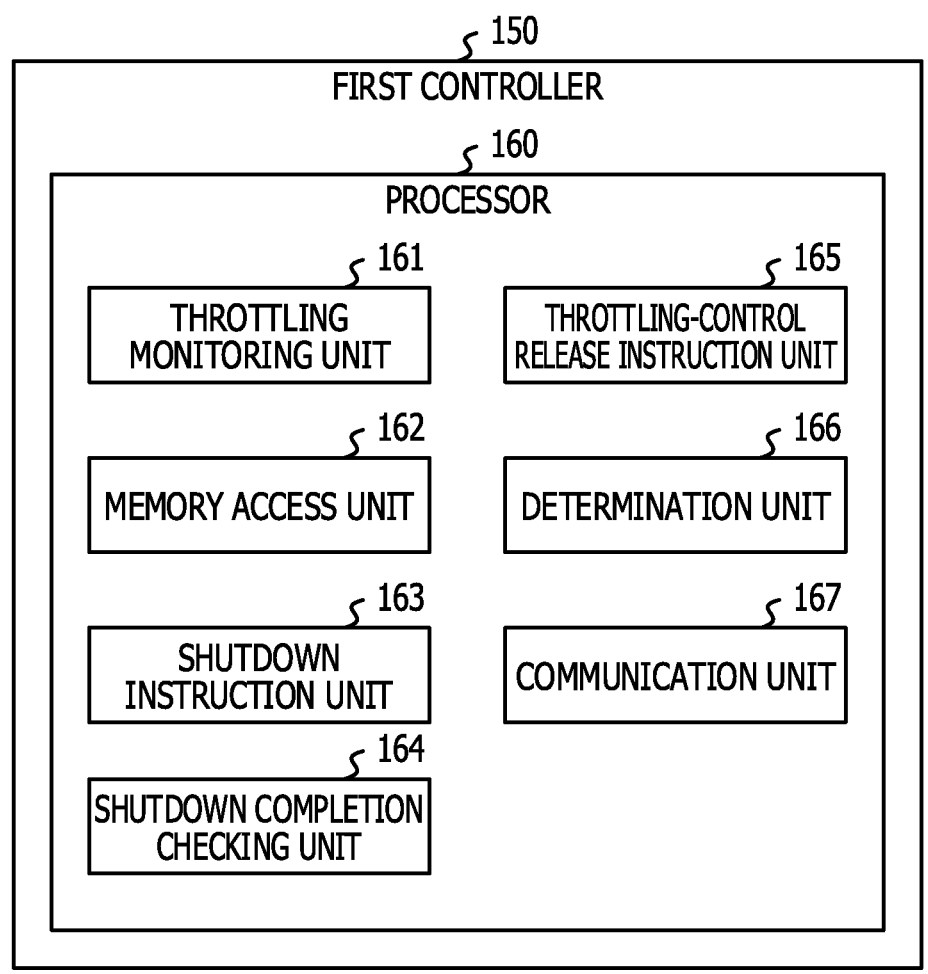
FIG. 6 is a functional block diagram of a controller according to the first embodiment.

FIG. 6 is a functional block diagram of the processor 160 of the first controller 150. The processor 160 implements the function of each block illustrated as FIG. 6 by executing a predetermined program stored in either the memory 180 or one of the memories included in the first information processing apparatus 10, or another memory that may be accessed via the network 500. The processor 260 of the second controller 250 also implements the same functions as those of the processor 160 of the first controller 150 by executing a predetermined program. In the following, the description will be directed to the processor 160 of the first controller 150, and a description of the processor 260 of the second controller 250 will be omitted.

The processor 160 functions as a throttling monitoring unit 161, a memory access unit 162, a shutdown instruction unit 163, a shutdown completion checking unit 164, a throttling-control release instruction unit 165, a determination unit 166, and a communication unit 167.

The throttling monitoring unit 161 monitors whether or not the first arithmetic processing unit 100 is in a throttling control state. This monitoring is performed by monitoring information stored in the throttling flag storing unit 113 of the first arithmetic processing unit 100. Alternatively, the throttling monitoring unit 161 may recognize that throttling control is being performed in the first arithmetic processing unit 100 by directly receiving a throttling-control instruction notification outputted from the power management unit 350. The memory access unit 162 accesses the memory 380 of the power management unit 350, and reads the contents of the shutdown list 381. The shutdown instruction unit 163 references the shutdown list 381 that has been read, and checks whether or not the first arithmetic processing unit 100 is subject to shutdown. Since the first arithmetic processing unit 100 is subject to shutdown in the example of the shutdown list 381 illustrated as FIG. 4, the shutdown instruction unit 163 instructs the first arithmetic processing unit 100 to execute a shutdown. The shutdown completion checking unit 164 checks whether or not a shutdown of another or other arithmetic processing units is completed. If the shutdown list 381 specifies that the second arithmetic processing unit 200 is subject to shutdown, and that the first arithmetic processing unit 100 is not subject to shutdown, the shutdown completion checking unit 164 checks whether or not a shutdown of the second arithmetic processing unit 200 is completed. Whether or not a shutdown of the second arithmetic processing unit 200 is completed is checked by, for example, checking information notified from the supply power monitoring unit 364 of the power management unit 350. Then, based on the checking result of the shutdown completion checking unit 164, the throttling-control release instruction unit 165 instructs the first arithmetic processing unit 100 to release throttling control. The instruction for releasing throttling control is made by clearing a throttling flag stored in the throttling flag storing unit 113 of the first arithmetic processing unit 100. Not all of these functions have to be implemented in the processor 160. One or some of the functions, for example, the memory access unit 162, may be implemented in a dedicated memory access controller.

Now, an additional description will be given of a shutdown of the first arithmetic processing unit 100. In the case of shutting down the first arithmetic processing unit 100, the subsequent information processing in the computer system 1 is executed in a distributed manner among other arithmetic processing units excluding the first arithmetic processing unit 100. Consequently, the management device 600 illustrated as FIG. 2 has to remove the first arithmetic processing unit 100 from the resources that may be used as arithmetic processing units by the computer system 1, and reconfigure the computer system 1 by using the remaining arithmetic processing units. Further, in a case where tasks that are in queue exist in the processor 110 of the first arithmetic processing unit 100 at the time when an instruction for a shutdown is issued, the shutdown is to be executed in such a way that does not cause processing errors related to those tasks to occur. A shutdown may be performed by the following procedure, for example. First, the shutdown instruction unit 163 of the first controller 150 instructs the first arithmetic processing unit 100 to execute a shutdown, and also notifies the management device 600 of the fact that the first arithmetic processing unit 100 is subject to shutdown. Upon receiving this notification, the management device 600 stops assignment of new tasks to the first arithmetic processing unit 100, and starts a reconfiguration of the computer system 1. Meanwhile, the shutdown processing unit 115 of the first arithmetic processing unit 100 completes the shutdown, after processing becomes complete for all of queued tasks in the processor 110 and the processing results are transmitted to other arithmetic processing units. Alternatively, in accordance with the reconfiguration results of the computer system 1 executed by the management device 600, the shutdown processing unit 115 completes the shutdown after handing over queued tasks to other arithmetic processing units without having these tasks processed by the arithmetic unit 111.

Figure 7:
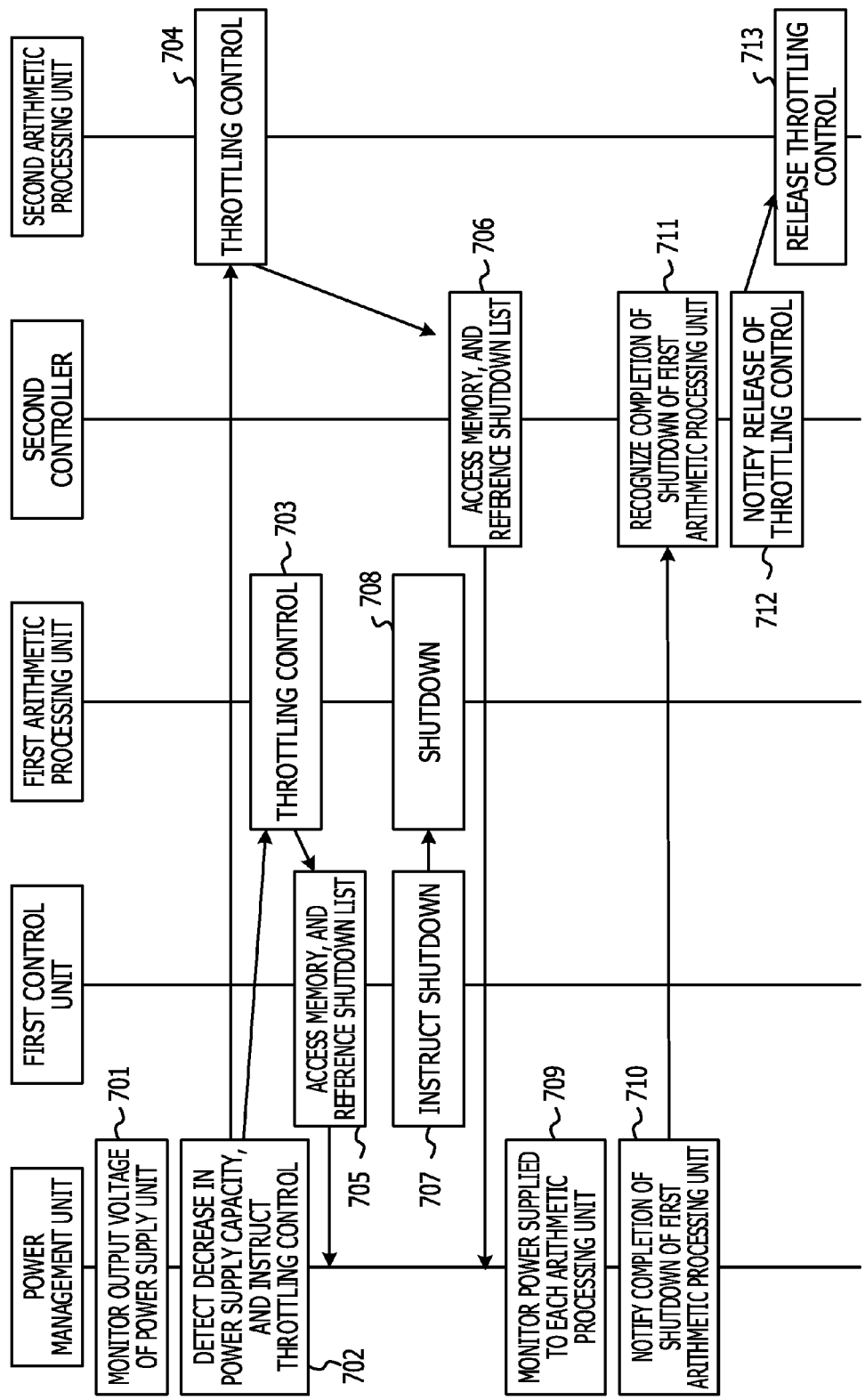
FIG. 7 is a process sequence diagram according to the first embodiment.

FIG. 7 illustrates a flow of processing between the power management unit 350, the first controller 150, the first arithmetic processing unit 100, the second controller 250, and the second arithmetic processing unit 200. First, in process 701, the power management unit 350 monitors the output voltage of each of the first power supply circuit 310 and the second power supply circuit 320 of the power supply unit 300. In process 702, in a case where one of the output voltages has fallen below a predetermined threshold, the power management unit 350 determines that the amount of power supply from the power supply unit 300 has decreased, and instructs the first arithmetic processing unit 100 and the second arithmetic processing unit 200 to perform throttling control. In process 703 and process 704, upon receiving the instruction from the power management unit 350, each of the first arithmetic processing unit 100 and the second arithmetic processing unit 200 executes throttling. In process 705 and process 706, the first controller 150 and the second controller 250 recognize that the first arithmetic processing unit 100 and the second arithmetic processing unit 200 have made a transition to throttling control, respectively, accesses the memory 380 of the power management unit 350, and references the shutdown list 381. In process 707, the first controller 150 instructs the first arithmetic processing unit 100 to execute a shutdown, in accordance with the contents of the shutdown list 381 illustrated as FIG. 4. Upon receiving this instruction, in process 708, the first arithmetic processing unit 100 executes a shutdown.

In process 709, the power management unit 350 monitors the power supplied to each of the first arithmetic processing unit 100 and the second arithmetic processing unit 200. Then, in process 710, the power management unit 350 recognizes that power supply to the first arithmetic processing unit 100 has stopped, and notifies the first controller 150 of the fact that the shutdown of the first arithmetic processing unit 100 is finished. In process 711, based on the notification from the power management unit 350, the second controller 250 recognizes that the shutdown of the first arithmetic processing unit 100 is completed. In process 712, the second controller 250 instructs the second arithmetic processing unit 200 to release throttling control. In process 713, upon receiving the instruction for releasing throttling control, the second arithmetic processing unit 200 releases throttling control.

Next, the respective process flowcharts of the power management unit 350, the first arithmetic processing unit 100, the second arithmetic processing unit 200, the first controller 150, and the second controller 250 will be described.

Figure 8:
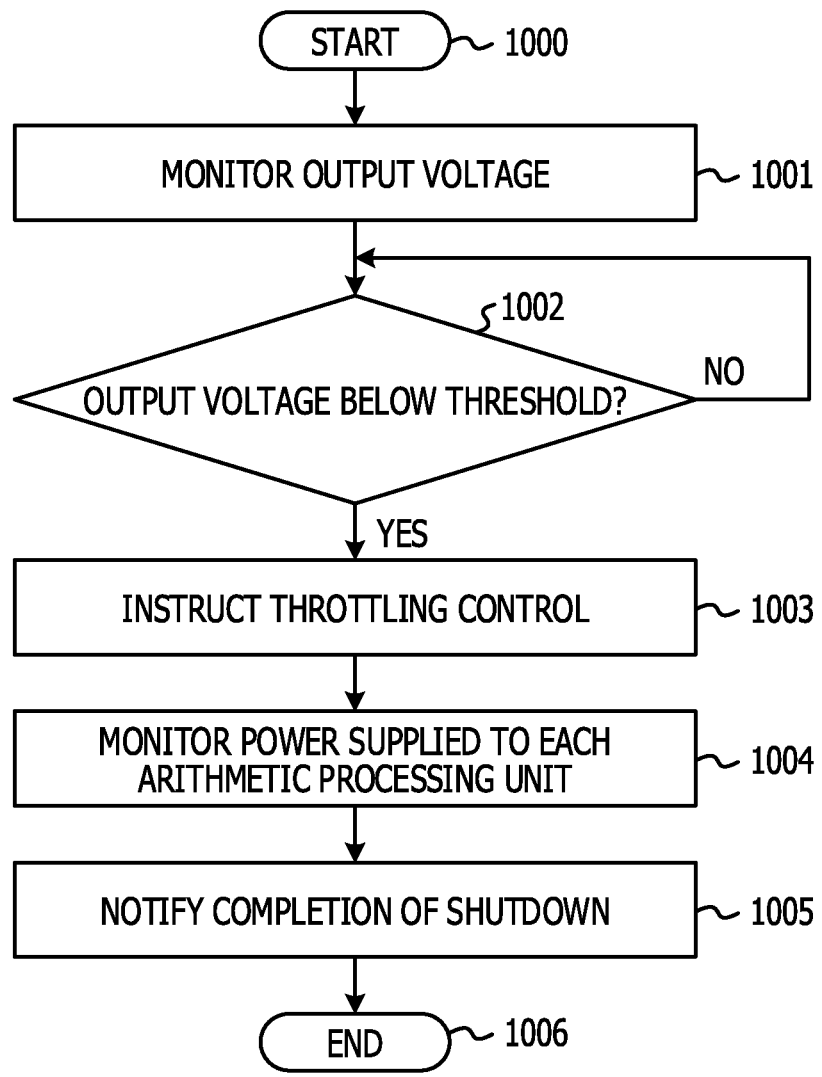
FIG. 8 is a process flowchart of a power management unit according to the first embodiment.

FIG. 8 illustrates a process flowchart of the power management unit 350. The processing in FIG. 8 is started by process 1000. In process 1001, the output voltage monitoring unit 361 monitors the output voltage of each of the first power supply circuit 310 and the second power supply circuit 320 via the power supply management bus 351. In process 1002, the determination 362 determines whether or not the output voltage being monitored has fallen below a predetermined threshold. This threshold is set for the following reason. That is, the output voltage of each of the first power supply circuit 310 and the second power supply circuit 320 sometimes fluctuates depending on the workload or the like on the first information processing apparatus 10, and a threshold is set to avoid erroneous determination caused by such fluctuations in output voltage. In a case where it is determined in process 1002 that the output voltage has fallen below the threshold, in process 1003, the throttling-control instruction unit 363 instructs the first arithmetic processing unit 100 and the second arithmetic processing unit 200 via the power supply management bus 351 to perform throttling control. In process 1004, the supply power monitoring unit 364 monitors the power supplied to each arithmetic processing unit. In process 1005, the supply power monitoring unit 364 determines that a shutdown is completed in an arithmetic processing unit for which supply of power has stopped, and supplies a shutdown completion notification to the second controller 250 via the internal bus 352. Then, the processing is ended in process 1006.

Figure 9:
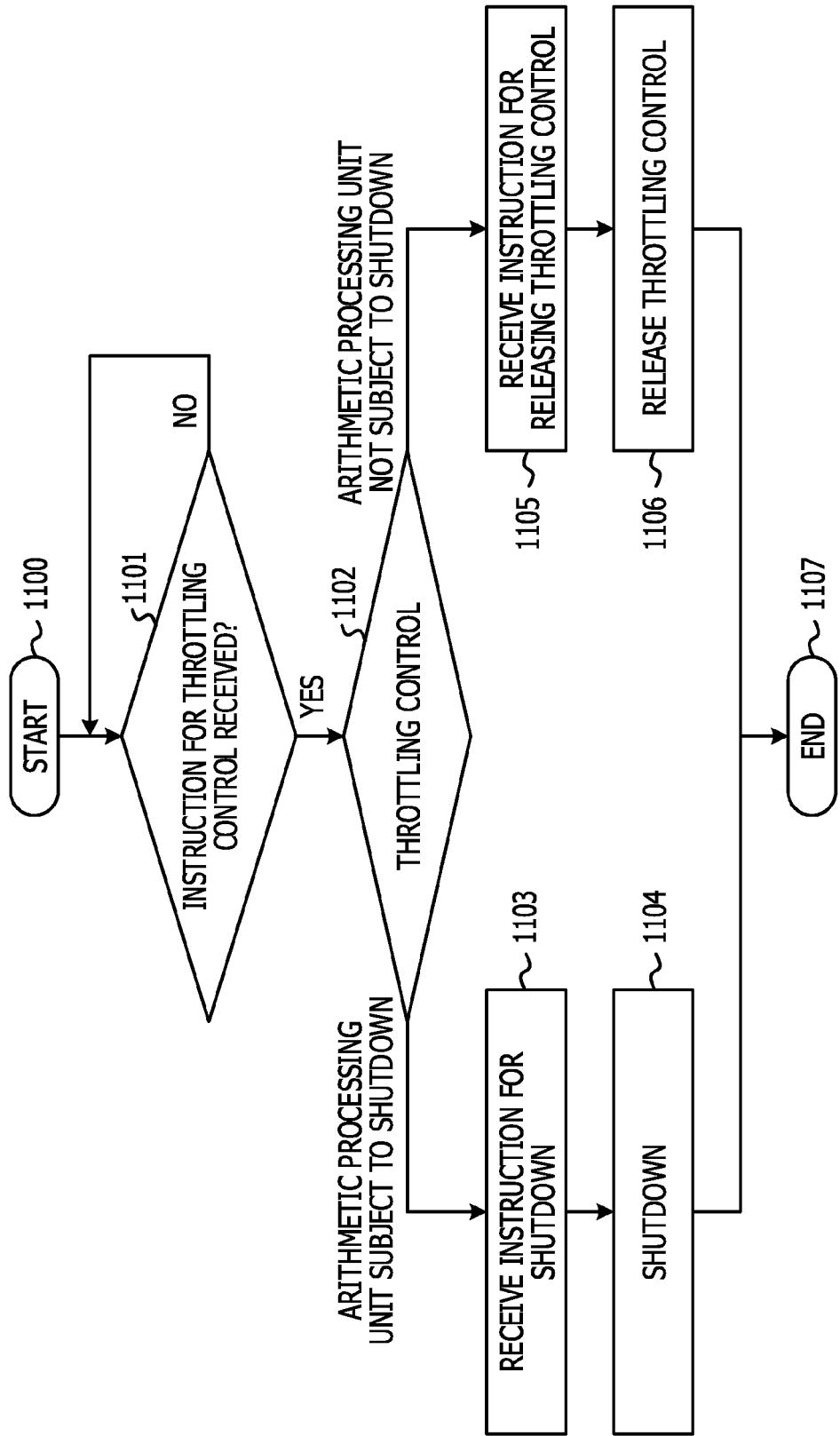
FIG. 9 is a process flowchart of an arithmetic processing unit according to the first embodiment.

FIG. 9 is a process flowchart of each of the first arithmetic processing unit 100 and the second arithmetic processing unit 200. Hereinafter, only processing in the first arithmetic processing unit 100 will be described, and because processing in the second arithmetic processing unit 200 is the same as the processing in the first arithmetic processing unit 100, a description of the processing in the second arithmetic processing unit 200 will be omitted.

The processing in FIG. 9 is started by process 1100. In process 1101, the determination unit 116 monitors information stored in the throttling flag storing unit 113, and determines whether or not an instruction for throttling control has been received from the power management unit 350. In a case where it is determined in process 1101 that an instruction for throttling control has been received, in process 1102, the throttling controller 114 executes throttling control. The processing proceeds to process 1103 for an arithmetic processing unit that is specified in the shutdown list 381 as being subject to shutdown after a transition is made to throttling control, and the processing proceeds to process 1105 for an arithmetic processing unit that is specified as not being subject to shutdown.

In a case where the first arithmetic processing unit 100 is subject to shutdown, in process 1103, the shutdown processing unit 115 receives an instruction for a shutdown from the shutdown instruction unit 163 of the first controller 150. In process 1104, the shutdown processing unit 115 executes a shutdown of the first arithmetic processing unit 100, and the processing is ended in process 1107.

In a case where the first arithmetic processing unit 100 is not subject to shutdown, in process 1105, the throttling flag storing unit 113 receives an instruction for releasing throttling control, and clears the throttling flag. In process 1106, the throttling controller 114 releases throttling control, and the processing is ended in process 1107.

Figure 10:
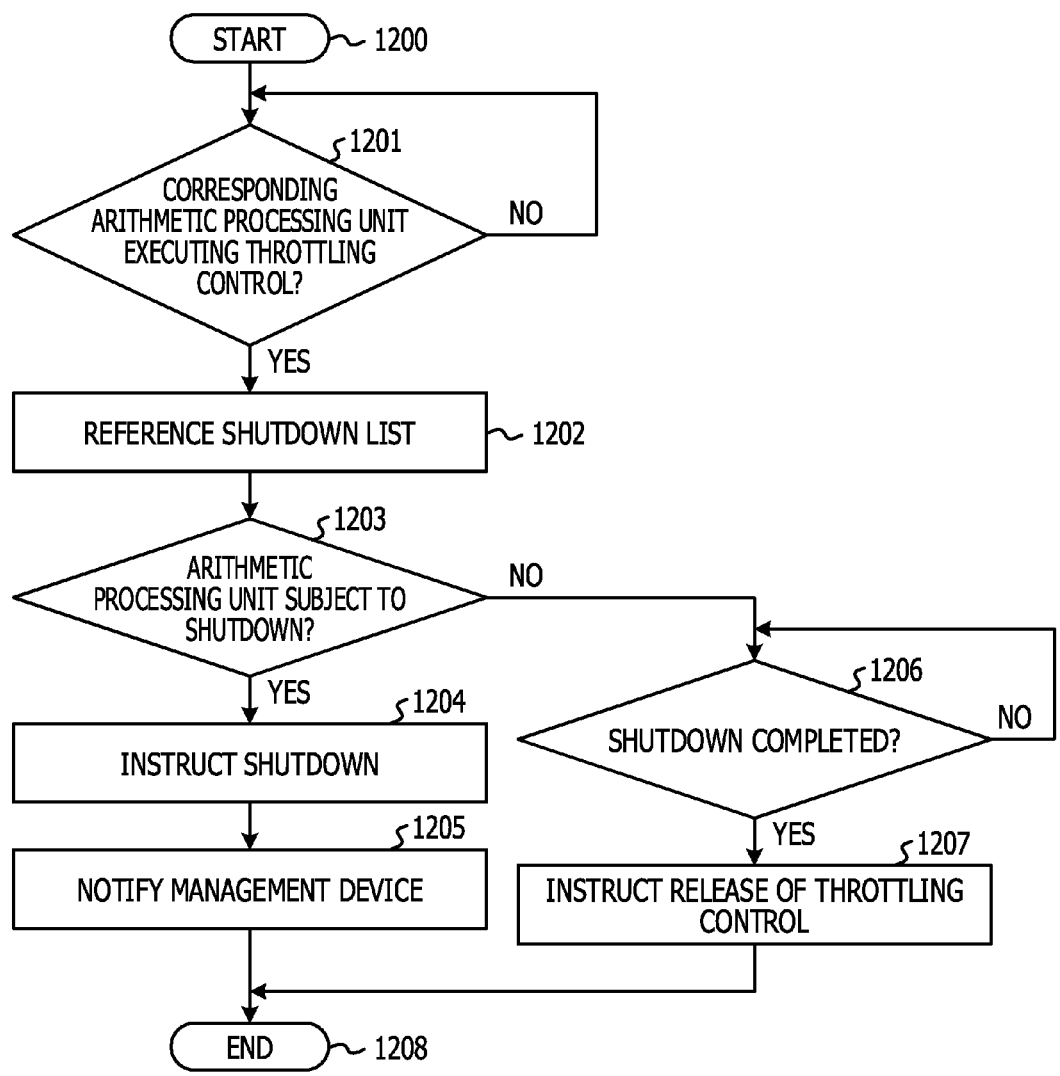
FIG. 10 is a process flowchart of a controller according to the first embodiment.

FIG. 10 is a process flowchart of each of the first controller 150 and the second controller 250. Hereinafter, only processing in the first controller 150 will be described, and because processing in the second controller 250 is the same as the processing in the first controller 150, a description of the processing in the second controller 250 will be omitted.

The processing in FIG. 10 is started by process 1200. In process 1201, the determination unit 166 determines whether or not the first arithmetic processing unit 100 is executing throttling control, by monitoring information stored in the throttling flag storing unit 113 of the first arithmetic processing unit 100 via the internal bus 352. In a case where it is determined in process 1201 that the first arithmetic processing unit 100 is executing throttling control, in process 1202, the memory access unit 162 accesses the memory 380 of the power management unit 350 via the internal bus 352, and reads the contents of the shutdown list 381. In process 1203, the determination unit 166 determines whether or not the first arithmetic processing unit 100 is specified in the shutdown list 381 as being subject to shutdown. The processing proceeds to process 1204 in a case where it is determined in process 1203 that the first arithmetic processing unit 100 is specified as being subject to shutdown, and the processing proceeds to process 1206 in a case where the first arithmetic processing unit 100 is specified as not being subject to shutdown.

In a case where the first arithmetic processing unit 100 is specified as being subject to shutdown, in process 1204, the shutdown instruction unit 163 instructs the shutdown processing unit 115 of the first arithmetic processing unit 100 via the internal bus 352 to execute a shutdown. In process 1205, the shutdown instruction unit 163 notifies the management device 600 of the fact that the first arithmetic processing unit 100 is subject to shutdown, and the processing is ended in process 1208.

In a case where the first arithmetic processing unit 100 is specified as not being subject to shutdown, in process 1206, the shutdown completion checking unit 164 determines whether or not the shutdown of an arithmetic processing unit that is specified as being subject to shutdown is completed. Specifically, the shutdown completion checking unit 164 checks whether or not a notification of shutdown completion has been received from the power management unit 350. In a case where it is determined in process 1206 that the shutdown of a predetermined arithmetic processing unit is completed, the processing proceeds to process 1207. In process 1207, the throttling-control release instruction unit 165 instructs that throttling control be released by rewriting information stored in the throttling flag storing unit 113 of the first arithmetic processing unit 100 via the internal bus 352, and the processing is ended in process 1208.

As described above, in the first embodiment, in a case where the amount of power supply from the power supply unit 300 has decreased in the first information processing apparatus 10 having multiple arithmetic processing units, first, throttling control is performed for the arithmetic processing units to reduce the load on the power supply unit 300. Thereafter, after shutting down one or some of the arithmetic processing units, the throttling control of another or other arithmetic processing units is released. This makes it possible to return the operating frequency to the original state while keeping the load on the power supply unit 300 reduced, thereby minimizing a practical decrease in the throughput of the second information processing apparatus 20 that performs information processing in corporation with the first information processing apparatus 10.

Next, a description will be made with regard to setting of the operating frequency in throttling control. For example, the relationship between the operating frequency F and power consumption P of a processor may be expressed by Equation (1) below:

$$P = CV^2F + VI \qquad (1)$$

In Equation (1), C denotes the sum of the capacitances of multiple elements included in the processor, V denotes the operating voltage of the processor, and I denotes the sum of currents flowing in the processor.

It is appreciated from Equation (1) that operating frequency and power consumption have a proportional relationship. Consequently, for example, power consumption may be roughly calculated as being reduced to about half when the operating frequency is halved. Therefore, in a case where power supply from the first power supply circuit 310 is cut off in the first information processing apparatus 10 having two power supply circuits as illustrated as FIG. 1, and the amount of power supply from the power supply unit 300 as a whole becomes 50% of the original value, the operating frequency may be decreased to 50% of the original value by throttling control. Further, in a case where the amount of power supply from the first power supply circuit 310 decreases to 50%, and the amount of power supply from the power supply unit 300 as a whole becomes 75%, the operating frequency may be decreased to 75% of the original value by throttling control. However, as is apparent from Equation (1), the power consumption of a processor fluctuates with not only the operating frequency but also with factors such as the operating voltage or leak current. Further, in a case where the first information processing apparatus 10 has, for example, a cooling device that cools the processor, the overall power consumption of the first information processing apparatus 10 also includes power consumed to run the cooling device, and the like. Accordingly, the operating frequency in throttling control is determined by also taking these factors into consideration.

Now, a description will be made of an example of how to set the operating frequency in throttling control in accordance with the amount of power supply from the power supply unit 300. The output voltage monitoring unit 361 of the power management unit 350 instructs that a transition be made to throttling control, and also notifies the first arithmetic processing unit 100 of information indicating the level of power supply. Upon receiving this notification, the throttling controller 114 of the first arithmetic processing unit 100 selects an operating frequency according to the level of power supply from the power supply unit 300. Selection of an operating frequency may be done by, for example, previously creating a table that specifies correspondence between the level of power supply and the operating frequency. As a result, the operating frequency in throttling control may be set in accordance with the level of power supply from the power supply unit 300. Of course, in a case where the amount of power supply falls below a predetermined value, throttling control may be performed with a predetermined operating frequency irrespective of the level of power supply. In this case, in accordance with an instruction for transition to throttling control, the throttling controller 114 instructs the clock generator 112 to generate a clock at a predetermined frequency.

While the first embodiment has been described above, the first embodiment may be modified and applied as follows.

In the first embodiment, it has been described that the second information processing apparatus 20 is an information processing apparatus having the same configuration as that of the first information processing apparatus 10. However, the second information processing apparatus 20 may not have multiple arithmetic processing units but may be configured to have a single arithmetic processing unit.

In the first embodiment, it has been described that the shutdown list 381 is stored in the memory 380 of the power management unit 350. However, the shutdown list 381 may not be stored in the memory 380. For example, the first controller 150 and the second controller 250 may store the shutdown list 381 in the memory 130 and the memory 230, respectively.

In the first embodiment, the power supply unit 300 having two power supply circuits has been described as an example. However, the first embodiment is applied not only to a case where the power supply unit 300 has multiple power supply circuits. For example, the first embodiment is applicable also to a case where the power supply unit 300 has a single power supply circuit, and the amount of power supply from the power supply unit 300 decreases owing to, for example, degradation of an element constituting the power supply circuit. Application of the first embodiment makes it possible to reduce the load on the element constituting the power supply circuit, thereby minimizing further degradation or failure of the power supply circuit. The first embodiment is also applicable to a case where the power supply unit 300 has three or more power supply circuits. For example, in a case where the power supply unit 300 has three or more power supply circuits, throttling may be performed at the time when a decrease in the output voltage of one of the power supply circuits has been detected, or throttling may be performed for the first time only in a case where a decrease in output voltage has been detected for two of the power supply circuits. As another control method, throttling may be performed with a first operating frequency in a case where a decrease in output voltage has been detected for one of the three power supply circuits, and throttling may be performed with a second operating frequency lower than the first operating frequency in a case where a decrease in output voltage has been detected for two of the power supply circuits.

In the first embodiment, the first information processing apparatus 10 having two arithmetic processing units has been described as an example. However, the first information processing apparatus 10 may have three or more arithmetic processing units. As regards which one of the three or more arithmetic processing units is to be shut down or for which one of the arithmetic processing units the throttling control is to be released, the shutdown list 381 is created by taking the power consumptions of the power supply units and arithmetic processing units into consideration. For example, the shutdown list 381 may specify that in the case of an information processing apparatus having three power supply circuits and three arithmetic processing units, one of the arithmetic processing units is shut down when a decrease in output voltage has occurred in one of the power supply circuits, and two of the arithmetic processing units are shut down when a decrease in output voltage has occurred in two of the power supply circuits.

For a power supply circuit in which a failure has occurred, for example, the power supply circuit is repaired or replaced, and after recovery of the power supply unit, the power management unit 350 notifies the first controller 150 that the power supply circuit has recovered via the power supply management bus 351. The first controller 150 executes a boot-up process of the first arithmetic processing unit 100.

While the first embodiment is directed to the case of detecting a decrease in the amount of power supply from the power supply unit 300 by monitoring the output voltage of each power supply circuit, another method may be employed. For example, a decrease in the amount of power supply may be detected by monitoring the output current of each power supply circuit.

Second Embodiment

The first embodiment is directed to the case where the first controller 150 is provided as a controller for the first arithmetic processing unit 100, the second controller 250 is provided as a controller for the second arithmetic processing unit 200, and each of the controllers gives instructions related to a shutdown and release of throttling control. In a second embodiment, the power management unit 350 gives instructions related to a shutdown and release of throttling control.

Figure 11:
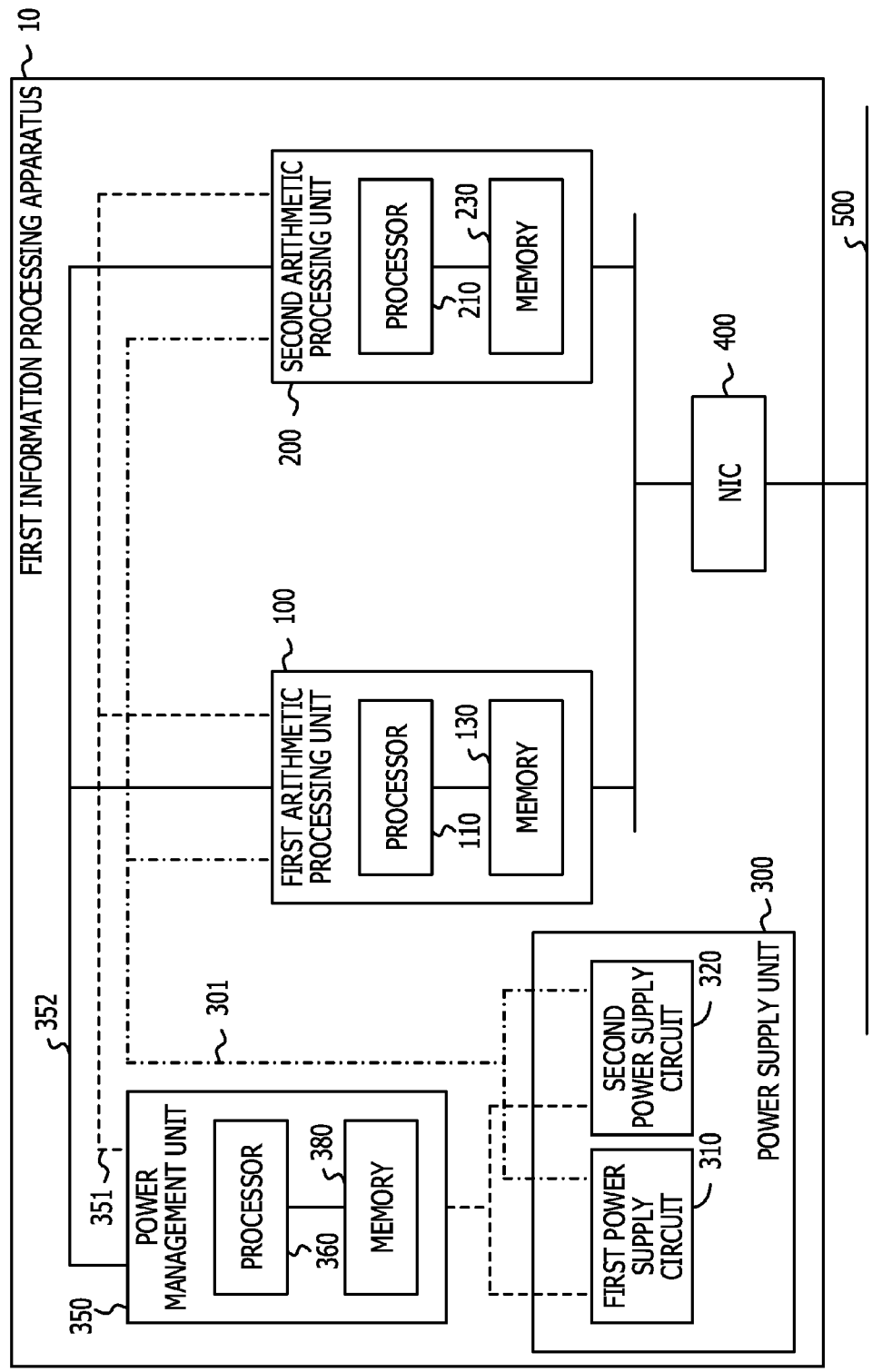
FIG. 11 is a hardware configuration diagram of an information processing apparatus according to a second embodiment.

FIG. 11 is a hardware configuration diagram of the first information processing apparatus 10 according to the second embodiment. Components that are the same as those illustrated as FIG. 1 are denoted by the same reference numerals. In comparison to the first embodiment, the first controller 150 and the second controller 250 are removed in the second embodiment.

Figure 12:
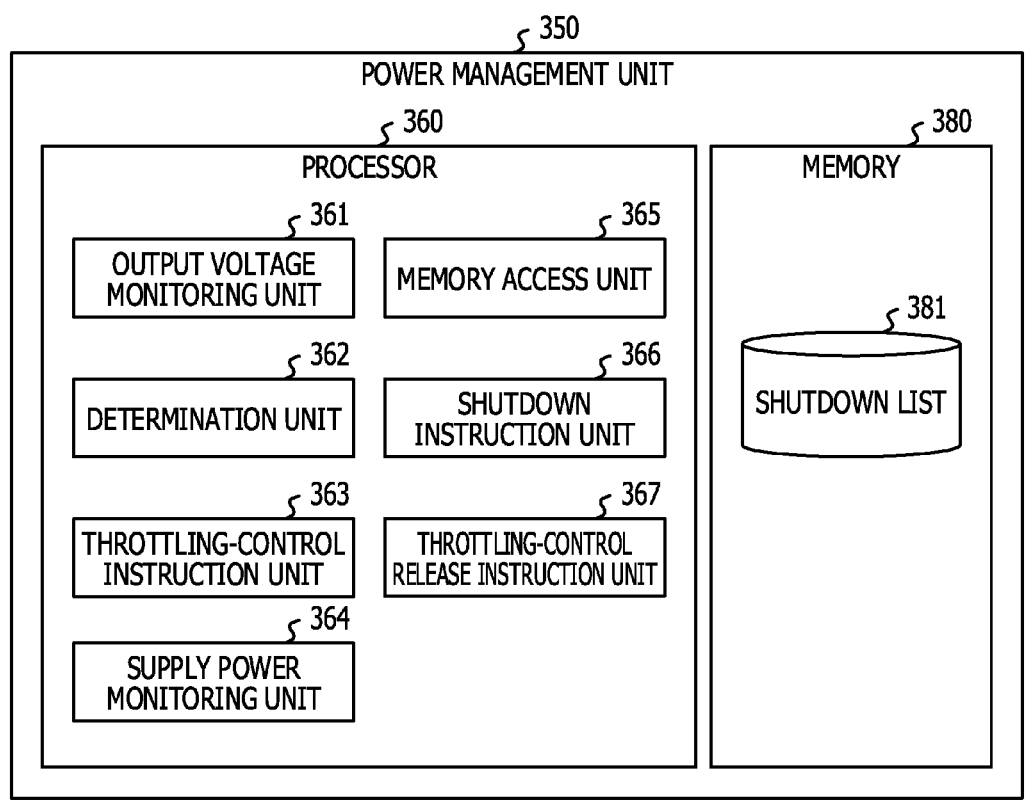
FIG. 12 is a functional block diagram of a power management unit according to the second embodiment.

FIG. 12 is a functional block diagram of the power management unit 350 according to the second embodiment. Functional blocks that are the same as the functional blocks illustrated as FIG. 3 are denoted by the same reference numerals, and a description of those functional blocks will be omitted. In addition to the functions illustrated as FIG. 3, the power management unit 350 also functions as a memory access unit 365, a shutdown instruction unit 366, and a throttling-control release instruction unit 367.

The memory access unit 365 accesses the memory 380, and reads the contents of the shutdown list 381. The shutdown instruction unit 366 instructs an arithmetic processing unit specified as being subject to shutdown to execute a shutdown. The throttling-control release instruction unit 367 instructs an arithmetic processing unit specified as not being subject to shutdown to release throttling control.

Figure 13:
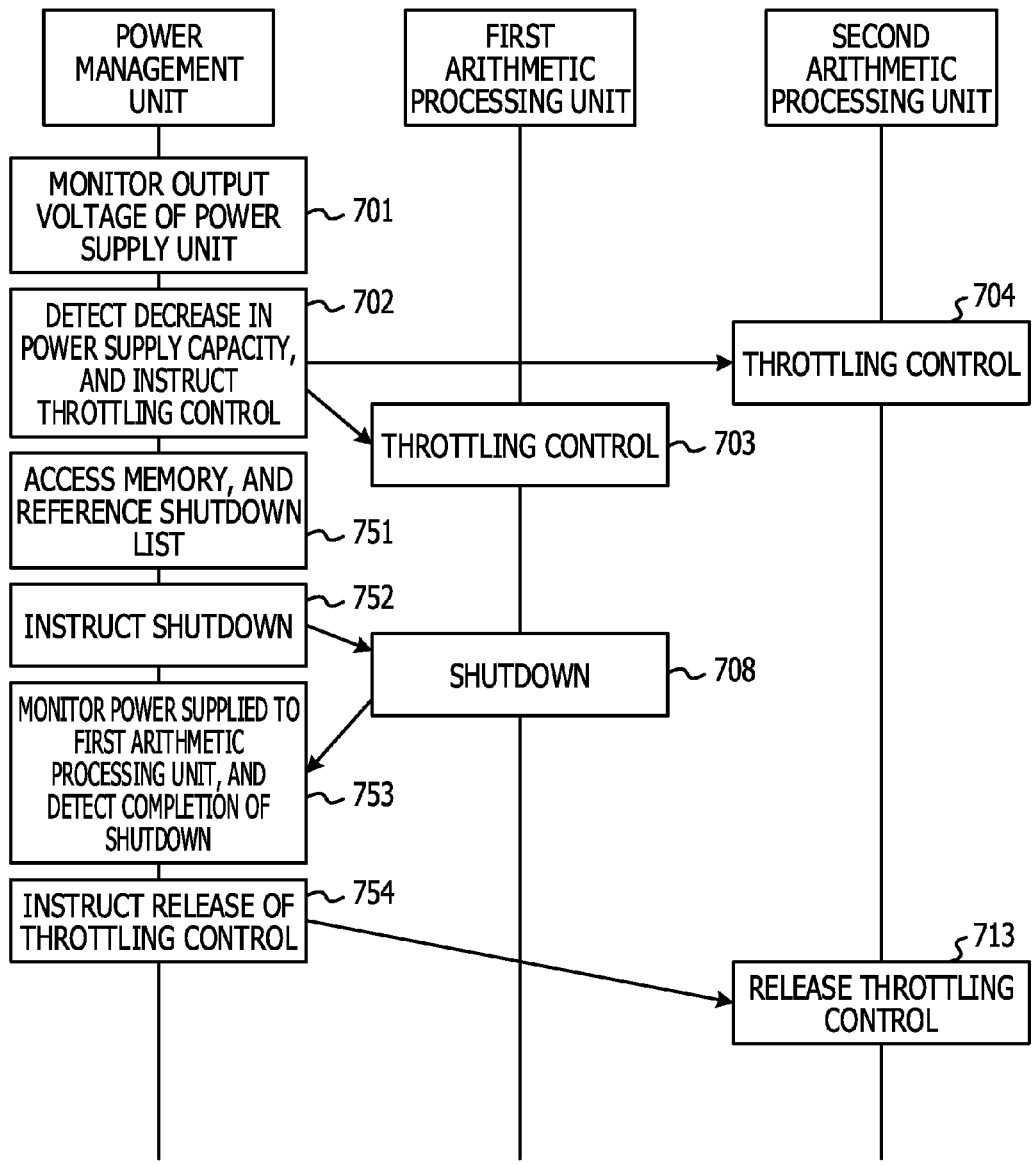
FIG. 13 is a process sequence diagram according to the second embodiment.

FIG. 13 illustrates a flow of processing between the power management unit 350, the first arithmetic processing unit 100, and the second arithmetic processing unit 200. Processes that are the same as those in FIG. 7 are denoted by the same reference numerals, and a description of those processes will be omitted. After instructing the first arithmetic processing unit 100 and the second arithmetic processing unit 200 to perform throttling control, in process 751, the power management unit 350 accesses the memory 380, and references the shutdown list 381. Then, in process 752, the power management unit 350 instructs the first arithmetic processing unit 100 to execute a shutdown in accordance with the information specified in the shutdown list 381. Next, in process 753, the power management unit 350 monitors the power supplied to the first arithmetic processing unit 100, and detects completion of a shutdown of the first arithmetic processing unit 100. Then, in process 754, the power management unit 350 instructs the second arithmetic processing unit 200 to release throttling control.

Figure 14:
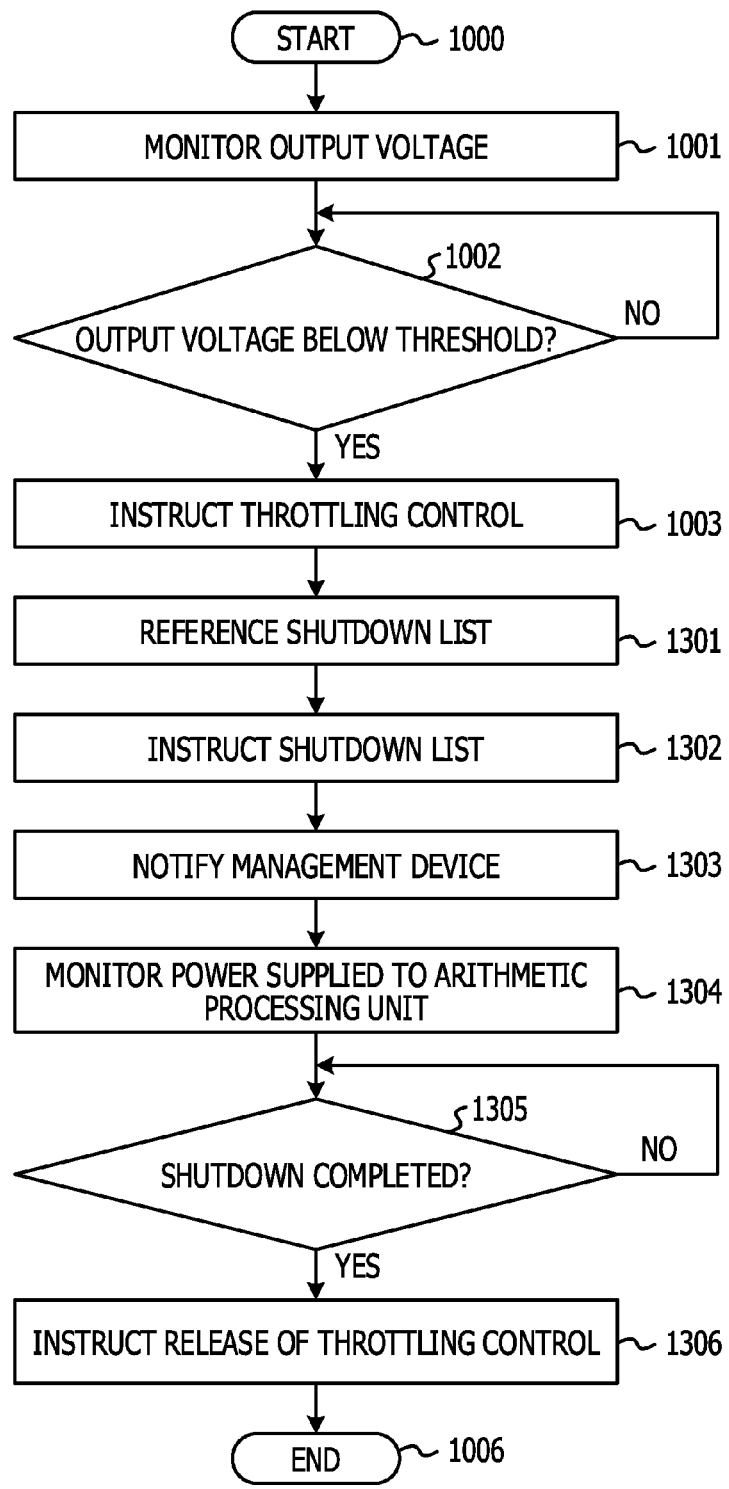
FIG. 14 is a process flowchart of a power management unit according to the second embodiment.

FIG. 14 is a process flowchart of the power management unit 350. Processes that are the same as those in FIG. 8 are denoted by the same reference numerals, and a description of those processes will be omitted. In process 1301, the memory access unit 365 accesses the memory 380 and reads the shutdown list 381. In process 1302, the shutdown instruction unit 366 instructs the first arithmetic processing unit 100 to execute a shutdown. In process 1303, the shutdown instruction unit 366 notifies the management device 600 that the first arithmetic processing unit 100 is to be shut down. In process 1304, the supply power monitoring unit 364 monitors the power supplied to the first arithmetic processing unit 100. In process 1305, based on the results of monitoring by the supply power monitoring unit 364, the determination unit 362 determines whether or not a shutdown of the first arithmetic processing unit 100 is completed. In a case where it is determined in process 1305 that the shutdown is completed, in process 1306, the throttling-control release instruction unit 367 instructs the second arithmetic processing unit 200 to release throttling control, and the processing is ended in process 1006.

In this way, in the second embodiment, the power management unit 350 instructs a shutdown and release of throttling control.

Third Embodiment

In the first and second embodiments, a method of shutting down one or some of multiple arithmetic processing units after a transition is made to throttling control, and then releasing the throttling control of another or other arithmetic processing units has been described as a method for protecting the power supply unit 300. There are other conceivable methods for protecting the power supply unit 300. For example, there is also a method in which, after a transition is made to throttling control, all of the arithmetic processing units are run while maintaining their throttling control, without shutting down one or some of the arithmetic processing units. As previously mentioned, this method may cause a decrease in the overall throughput of the computer system 1 in a case where the first information processing apparatus 10 configures the computer system 1 in corporation with the second information processing apparatus 20. That said, this method proves effective as a method for protecting the power supply unit 300 in a case where the first information processing apparatus 10 performs information processing singularly. Accordingly, by making it possible to select multiple control methods including the control method described above with reference to the first embodiment or the second embodiment for the first information processing apparatus 10, the convenience of the first information processing apparatus 10 improves. In a third embodiment, an information processing apparatus is disclosed which incorporates multiple measures (policies) that may be taken when the amount of power supply from the power supply unit 300 decreases. The third embodiment is applicable to both of the first information processing apparatus 10 having the hardware configuration illustrated as FIG. 1, and the first information processing apparatus 10 having the hardware configuration illustrated as FIG. 11.

FIG. 15 illustrates an example of the shutdown list 381 in the third embodiment. In the illustrated example, two policies may be selected. A first policy specifies that after making a transition to throttling control, the first arithmetic processing unit 100 executes a shutdown, and the second arithmetic processing unit 200 maintains throttling control. A second policy specifies that after making a transition to throttling control, both the first arithmetic processing unit 100 and the second arithmetic processing unit 200 maintain throttling control.

Figure 16:
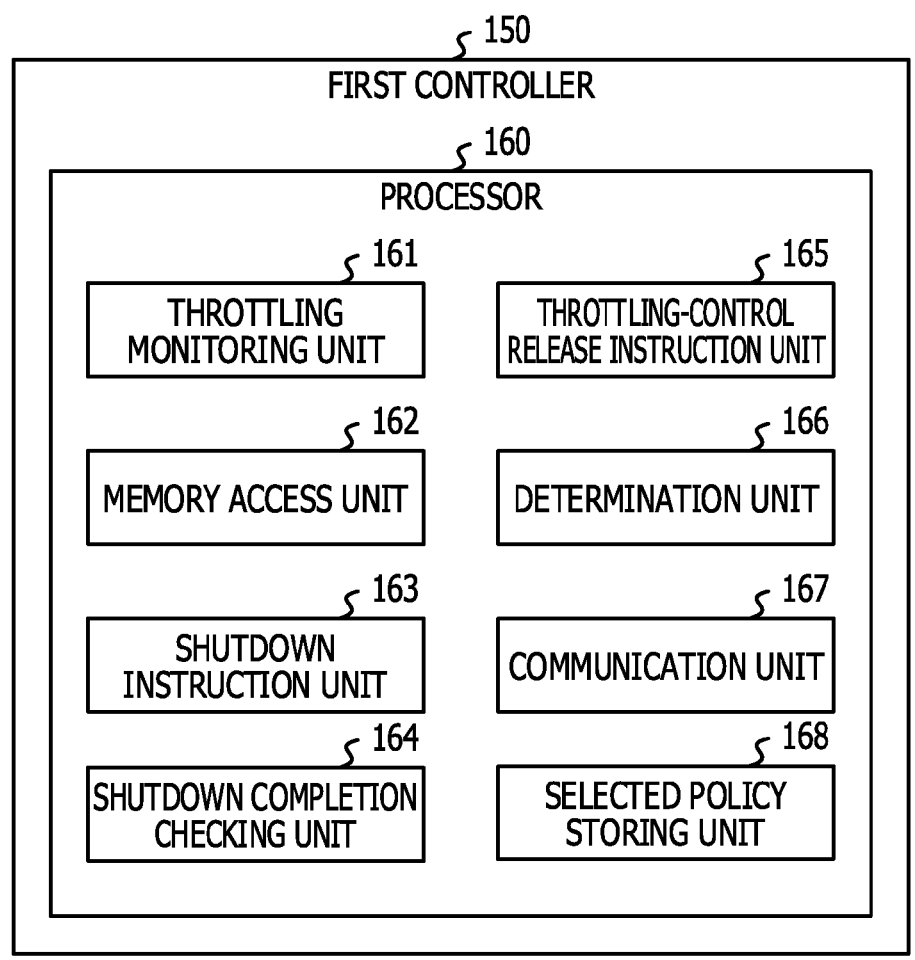
FIG. 16 is a functional block diagram of a controller according to the third embodiment.

FIG. 16 is a functional block diagram of the first controller 150 in a case where the third embodiment is applied to the first information processing apparatus 10 having the hardware configuration illustrated as FIG. 1. Since the second controller 250 has the same functions as those of the first controller 150, a description of the second controller 250 will be omitted. Further, functional blocks that are the same as those in FIG. 6 are denoted by the same reference numerals, and a description of those functional blocks will be omitted.

The processor 160 of the first controller 150 functions as a selected policy storing unit 168 by executing a predetermined program. For example, the user of the first information processing apparatus 10 selects which one of the first policy and the second policy is to be executed and, for example, a logical value "0" is stored into the selected policy storing unit 168 in a case where the first policy is selected, and a logical value "1" is stored into the selected policy storing unit 168 in a case where the second policy is selected. When referencing the shutdown list 381 stored in the memory 380, the memory access unit 162 reads information of the processing corresponding to the selected policy stored in the selected policy storing unit 168, and the shutdown instruction unit 163, the throttling-control release instruction unit 165, or the like performs processing according to the contents of the shutdown list 381.

While the above description is directed to the case where the third embodiment is applied to the first information processing apparatus 10 having the hardware configuration illustrated as FIG. 1, in the case of applying the third embodiment to the first information processing apparatus 10 having the hardware configuration illustrated as FIG. 11, the functional block corresponding to the selected policy storing unit 168 is implemented in the processor 360 of the power management unit 350.

The selected policy storing unit 168 may not be implemented in the processor 160, but may be implemented by using a dedicated register.

Fourth Embodiment

The first to third embodiments are directed to the case where, when the amount of power supply from the power supply unit 300 decreases, throttling control is executed uniformly for all of the arithmetic processing units included in the first information processing apparatus 10. However, these embodiments may be modified so that throttling control is not executed for all of the arithmetic processing units included in the first information processing apparatus 10 but only for one or some of the arithmetic processing units.

For example, suppose that in the first information processing apparatus 10 illustrated as FIG. 1, the first power supply circuit 310 and the second power supply circuit 320 each have a power supply capacity of 700 W (1400 W in total), and the first arithmetic processing unit 100 and the second arithmetic processing unit 200 each consume power of 500 W (1000 W in total). Suppose that in this state, a failure occurs in the first power supply circuit 310, and supply of power from the first power supply circuit 310 stops. In this case, in order not to exceed 700 W which is the power supply capacity of the second power supply circuit 320, for the second arithmetic processing unit 200 that is not subject to shutdown, throttling control may not be performed so that its power supply capacity remains 500 W, and the power consumption of the first arithmetic processing unit 100 may be reduced to 200 W by throttling control. Thereafter, the first arithmetic processing unit 100 is shut down. As a result, as for the second arithmetic processing unit 200, the load on the second power supply circuit 320 may be reduced without changing the operating frequency of the second arithmetic processing unit 200, while minimizing a practical decrease in the throughput of the second information processing apparatus 20.

In the case of performing such control, upon detecting a decrease in the amount of power supply from the power supply unit 300, the power management unit 350 instructs the second arithmetic processing unit 200 to perform throttling control, and does not instruct the first arithmetic processing unit 100 to perform throttling control.

Further, as a modification of the fourth embodiment, it is also possible to divide the amount of power supply into multiple levels, and make the control vary depending on the level to which the power supply level has dropped. For example, in a case where the power supply level has dropped from a first level that is a normal level to a second level lower than the first level, throttling control is performed for the first arithmetic processing unit 100 while maintaining the operating frequency of the second arithmetic processing unit 200, and thereafter, the first arithmetic processing unit 100 is shut down. In a case where the power supply level has dropped to a third level which is even lower than the second level, throttling control is performed for both of the first arithmetic processing unit 100 and the second arithmetic processing unit 200, and thereafter, the first arithmetic processing unit 100 is shut down and the throttling control of the second arithmetic processing unit 200 is released.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing method using a first information processing apparatus, the first information processing apparatus including a power supply circuit, a first processor configured to receive power supply from the power supply circuit, and a second processor configured to receive power supply from the power supply circuit, the information processing method comprising:
   detecting an amount of the power supply of the power supply circuit;
   determining whether the amount of the power supply is in a first level or in a second level;
   when the amount of the power supply is determined to be in the first level, executing a first process; and
   when the amount of the power supply is determined to be in the second level, executing a second process, wherein
   the first process includes:
      decreasing an operating frequency of the first processor, while maintaining an operating frequency of the second processor,
      completing a task assigned to the first processor, and
      after completing the task, stopping data processing of the first processor, and
   the second process includes:
      decreasing the operating frequency of the first processor and the operating frequency of the second processor,
      completing the task assigned to the first processor,
      after the completing the task, stopping data processing of the first processor, and
      after the stopping the data processing of the first processor, increasing the operating frequency of the second processor.

2. The information processing method according to claim 1, wherein
   the second level is lower than the first level.

3. The information processing method according to claim 1, wherein:
   the power supply circuit includes a first power supply circuit and a second power supply circuit; and
   the detecting the amount of power supply is executed by detecting a decrease in an output voltage of one of the first power supply circuit and the second power supply circuit.

4. The information processing method according to claim 1, wherein:
   the first information processing apparatus further includes a first control circuit and a second control circuit; and
   the information processing method further comprises
   instructing the first processor to stop data processing, by the first control circuit, after decreasing the operating frequency of the first processor; and
   instructing the second processor to increase the operating frequency of the second processor, by the second control circuit, after stopping data processing of the first processor.

5. The information processing method according to claim 1, wherein:
   the decreasing of the operating frequency of the first processor includes decreasing the operating frequency of the first processor from a first frequency to a second frequency;
   the decreasing of the operating frequency of the second processor includes decreasing the operating frequency of the second processor from the first frequency to the second frequency; and
   the increasing of the operating frequency of the second processor includes increasing the operating frequency of the second processor from the second frequency to the first frequency.

6. The information processing method according to claim 5, wherein:
   the first information processing apparatus is coupled to a second information processing apparatus via a network; and
   the second information processing apparatus operates at the first frequency, and performs information processing in synchronism with the first information processing apparatus.

7. An information processing apparatus comprising:
   a power supply circuit;
   a first processor configured to receive power supply from the power supply circuit;
   a second processor configured to receive power supply from the power supply circuit; and
   a control circuit coupled to the first processor and the second processor, and configured to detect an amount of the power supply of the power supply circuit;
determine whether the amount of the power supply is in a first level or in a second level;
when the amount of the power supply is determined to be in the first level, execute a first process; and
when the amount of the power supply is determined to be in the second level, execute a second process, wherein
the first process includes:
  decreasing an operating frequency of the first processor, while maintaining an operating frequency of the second processor,
  completing a task assigned to the first processor, and
  after completing the task, stopping data processing of the first processor, and
the second process includes:
  decreasing the operating frequency of the first processor and the operating frequency of the second processor,
  completing the task assigned to the first processor,
  after the completing the task, stopping data processing of the first processor, and
  after the stopping the data processing of the first processor, increasing the operating frequency of the second processor.

8. The information processing apparatus according to claim 7, wherein
the second level is lower than the first level.

9. The information processing apparatus according to claim 7, wherein:
the power supply circuit includes a first power supply circuit and a second power supply circuit; and
the detecting the amount of power supply is executed by detecting a decrease in an output voltage of one of the first power supply circuit and the second power supply circuit.

10. The information processing apparatus according to claim 7, wherein
the control circuit includes a first control circuit and a second control circuit, the first control circuit instructs the first processor to stop data processing, after decreasing the operating frequency of the first processor, and the second control circuit instructs the second processor to increase the operating frequency of the second processor, after stopping data processing of the first processor.

11. The information processing apparatus according to claim 7, wherein:
the decreasing of the operating frequency of the first processor includes decreasing the operating frequency of the first processor from a first frequency to a second frequency;

the decreasing of the operating frequency of the second processor includes decreasing the operating frequency of the second processor from the first frequency to the second frequency; and
the increasing of the operating frequency of the second processor includes increasing the operating frequency of the second processor from the second frequency to the first frequency.

12. The information processing apparatus according to claim 11, wherein:
the information processing apparatus is coupled to another information processing apparatus via a network; and
the another information processing apparatus operates at the first frequency, and performs information processing in synchronism with the first information processing apparatus.

13. A non-transitory computer-readable storage medium storing a program that causes an information processing apparatus to execute a process, the information processing apparatus including a power supply circuit, a first processor configured to receive power supply from the power supply circuit, and a second processor configured to receive power supply from the power supply circuit, the process comprising:
detecting an amount of the power supply of the power supply circuit;
determining whether the amount of the power supply is in a first level or in a second level;
when the amount of the power supply is determined to be in the first level, executing a first process; and
when the amount of the power supply is determined to be in the second level, executing a second process, wherein
the first process includes:
  decreasing an operating frequency of the first processor, while maintaining an operating frequency of the second processor,
  completing a task assigned to the first processor, and
  after completing the task, stopping data processing of the first processor, and
the second process includes:
  decreasing the operating frequency of the first processor and the operating frequency of the second processor,
  completing the task assigned to the first processor,
  after the completing the task, stopping data processing of the first processor, and
  after the stopping the data processing of the first processor, increasing the operating frequency of the second processor.

14. The non-transitory computer-readable storage medium according to claim 13, wherein
the second level is lower than the first level.

* * * * *